United States Patent
Takimoto et al.

(10) Patent No.: US 11,268,873 B2
(45) Date of Patent: Mar. 8, 2022

(54) SHIELD STRUCTURE FOR PRESSURE SENSOR, AND PRESSURE SENSOR PROVIDED WITH SAME

(71) Applicant: Saginomiya Seisakusho, Inc., Tokyo (JP)

(72) Inventors: Kazuya Takimoto, Sayama (JP); Tatsuya Tanaka, Sayama (JP); Tomoharu Oba, Tokorozawa (JP)

(73) Assignee: SAGINOMIYA SEISAKUSHO, INC., Tokyo (JP)

( * ) Notice: Subject to any disclaimer, the term of this patent is extended or adjusted under 35 U.S.C. 154(b) by 39 days.

(21) Appl. No.: 16/767,004

(22) PCT Filed: Nov. 13, 2018

(86) PCT No.: PCT/JP2018/041952
§ 371 (c)(1),
(2) Date: May 26, 2020

(87) PCT Pub. No.: WO2019/107140
PCT Pub. Date: Jun. 6, 2019

(65) Prior Publication Data
US 2021/0003469 A1 Jan. 7, 2021

(30) Foreign Application Priority Data
Nov. 30, 2017 (JP) .............................. JP2017-230548

(51) Int. Cl.
*G01L 19/14* (2006.01)
*G01L 9/00* (2006.01)

(52) U.S. Cl.
CPC ............ *G01L 19/14* (2013.01); *G01L 9/0041* (2013.01)

(58) Field of Classification Search
None
See application file for complete search history.

(56) References Cited

U.S. PATENT DOCUMENTS

| | | | |
|---|---|---|---|
| 9,915,577 B2* | 3/2018 | Strott | G01L 19/0069 |
| 10,288,457 B2* | 5/2019 | Jacobsen | G12B 9/04 |
| 2004/0135666 A1 | 7/2004 | Kurtz et al. | |
| 2017/0030789 A1* | 2/2017 | Okawa | G01L 19/0038 |

(Continued)

FOREIGN PATENT DOCUMENTS

| | | |
|---|---|---|
| CN | 2718545 Y | 8/2005 |
| EP | 3159670 A1 | 4/2017 |

(Continued)

OTHER PUBLICATIONS

International Preliminary Report on Patentability dated Jun. 2, 2020, issued in PCT Application No. PCT/JP2018/041952, filed Nov. 13, 2018.

(Continued)

*Primary Examiner* — Andre J Allen
*Assistant Examiner* — Jermaine L Jenkins
(74) *Attorney, Agent, or Firm* — Workman Nydegger (57) ABSTRACT

In a pressure sensor, an electric field acting on one end surface of a sensor chip (16) is blocked by a shielding member (17), and an electric field acting on another end surface of the sensor chip (16) is removed through one end portion of a chip mounting member (18), a group of input and output terminals (40*ai*), and a bonding wire (Wi).

6 Claims, 6 Drawing Sheets

(56) References Cited

U.S. PATENT DOCUMENTS

2017/0131169 A1* 5/2017 Takimoto ............ G01L 19/0645
2020/0386642 A1* 12/2020 Takimoto ................ H01L 29/84
2020/0400523 A1* 12/2020 Takimoto ................ G01L 19/00

FOREIGN PATENT DOCUMENTS

| JP | 2003-302300 A | 10/2003 |
| JP | 3987386 A | 7/2007 |
| JP | 2010-256213 A | 11/2010 |

OTHER PUBLICATIONS

Extended European Search Report dated Jul. 21, 2021, for EP18882649.9 filed Nov. 13, 2018.

* cited by examiner

SHIELD STRUCTURE FOR PRESSURE SENSOR, AND PRESSURE SENSOR PROVIDED WITH SAME

TECHNICAL FIELD

The present invention relates to a shield structure for a pressure sensor and a pressure sensor provided with the same.

BACKGROUND ART

As shown in PATENT DOCUMENT 1, for example, a sensor unit to be built in a liquid sealing semiconductor pressure sensor comprises, as its main elements: a metallic diaphragm supported inside a joint and configured to isolate a pressure detection chamber from a liquid sealing chamber to be described below; the liquid sealing chamber formed above the metallic diaphragm and configured to accommodate a silicone oil serving as a pressure transmitting medium; a sensor chip provided in the liquid sealing chamber and configured to detect a variation in pressure in the silicone oil via the metallic diaphragm; a sensor chip mounting member configured to support the sensor chip; a hermetic glass configured to establish hermetic seal around the sensor chip mounting member in a through hole of a housing; and a group of terminals (lead pins) configured to send an output signal from the sensor chip and to supply electric power to the sensor chip.

In the above-described configuration, the metallic diaphragm, a base plate, and the joint are connected to one another at the same electric potential while these regions are insulated from the sensor chip. In a case where a primary power supply being a power source is insufficiently insulated from a secondary power supply being a control circuit to process the output signal from the sensor chip, an electric potential difference occurs between the metallic diaphragm and the sensor chip, which are located opposite to each other, because impedance on the sensor chip side is higher. To avoid an effect (a variation in output from the pressure sensor) on an electronic circuit and on a non-volatile memory in such a sensor chip attributed to the electric potential difference occurring both on the metallic diaphragm and on the sensor chip, provision of a metallic lower plate and a metallic member provided on an end surface of a hermetic glass in such a way as to surround the sensor chip and to define a cylindrical space has been proposed as shown in PATENT DOCUMENT 1, for example. The sensor chip is electrically connected to lead pins and a metallic member, which are coupled via a presser plate to a zero potential of an electronic circuit that is integrated in the sensor chip. Hereby, because the electric potentials of the lower plate and the metallic member become equal to the zero potential of the electronic circuit of the sensor chip located in the space surrounded by the lower plate and the metallic member, there is no difference in electric potential between the metallic diaphragm and the sensor chip. Accordingly, there is no risk of occurrence of an electric field that may affect the electronic circuit of the sensor chip.

PRIOR ART DOCUMENT

Patent Document

PATENT DOCUMENT 1: Japanese Patent No. 3,987,386

SUMMARY OF INVENTION

However, the electric field that may affect the electronic circuit of the sensor chip is also liable to occur between a supporting surface of the sensor chip mounting member and a back surface of the sensor chip not covered by the lower plate and the metallic member mentioned above. In that case, there is a concern of the occurrence of a variation in output from the pressure sensor attributed to the aforementioned electric potential difference. Accordingly, there is a demand for further improving resistance to the electric field occurring between the sensor chip and the diaphragm in the pressure sensor.

In view of the above-described problem, the present invention aims to provide a shield structure for a pressure sensor and a pressure sensor provided with the same. The shield structure for a pressure sensor and a pressure sensor provided with the same can improve resistance to an electric field occurring between a sensor chip and a diaphragm in the pressure sensor.

To achieve the above-described object, a shield structure for a pressure sensor according to the present invention comprises: a sensor unit including a sensor chip for detecting a pressure and sending a detection output signal, a supporting member supporting the sensor chip, a diaphragm for partitioning a liquid sealing chamber which the sensor chip and the supporting member are placed into a pressure chamber face to face relationship with the liquid sealing chamber, and a group of input-output terminals electrically connected to the sensor chip and to the supporting member; and an electric field blocking member placed between one end surface of the sensor chip in the liquid sealing chamber and the diaphragm by being supported from the supporting member, and for blocking an electric field acting on a signal processing electronic circuit unit of the sensor chip, wherein, an electric potential of a portion of the supporting member supporting the sensor chip and an electric potential of the electric field blocking member are an electric potential equal to an electric potential of the signal processing electronic circuit unit of the sensor chip.

The supporting member may be supported by a sensor housing through an insulator. The supporting member may be a chip mounting member or a conductive plate joined to a sensor housing.

A pressure sensor according to the present invention comprises: a sensor unit including a sensor chip for detecting a pressure and sending a detection output signal, a supporting member supporting the sensor chip, a diaphragm for partitioning a liquid sealing chamber which the sensor chip and the supporting member are placed into a pressure chamber face to face relationship with the liquid sealing chamber, and a group of input-output terminals electrically connected to the sensor chip and to the supporting member; an electric field blocking member placed between one end surface of the sensor chip in the liquid sealing chamber and the diaphragm by being supported by the supporting member, and for blocking an electric field acting on a signal processing electronic circuit unit of the sensor chip; and a sensor unit accommodating portion accommodating the sensor unit and the electric field blocking member, wherein an electric potential of a portion of the supporting member supporting the sensor chip and an electric potential of the electric field blocking member are an electric potential equal to an electric potential of the signal processing electronic circuit unit of the sensor chip. The supporting member may be supported by a sensor housing through an insulator.

According to the shield structure for a pressure sensor and the pressure sensor provided with the same of the present invention, the electric potential of the portion of the supporting member supporting the sensor chip and the electric potential of the electric field blocking member are set to the same potential as the electric potential of the signal processing electronic circuit unit. Therefore, it is possible to improve resistance to an electric field occurring between the sensor chip and the diaphragm in the pressure sensor.

DESCRIPTION OF EMBODIMENTS

Figure 1:
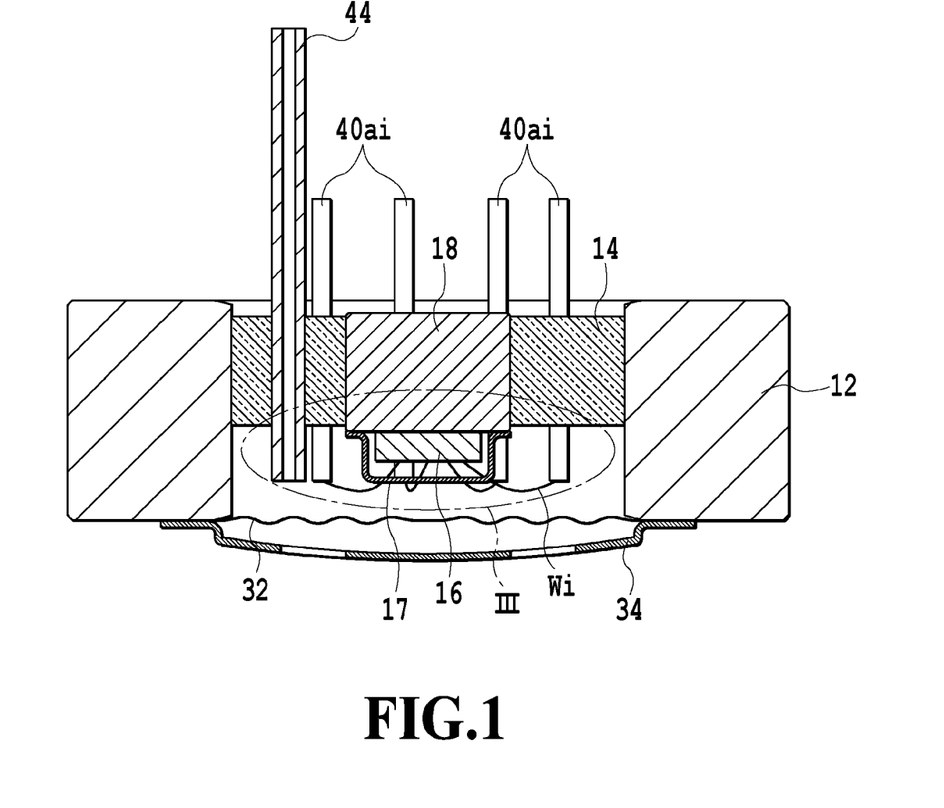
FIG. 1 is a cross-sectional view showing the essential parts of an example of a shield structure for a pressure sensor according to the present invention.
Figure 2:
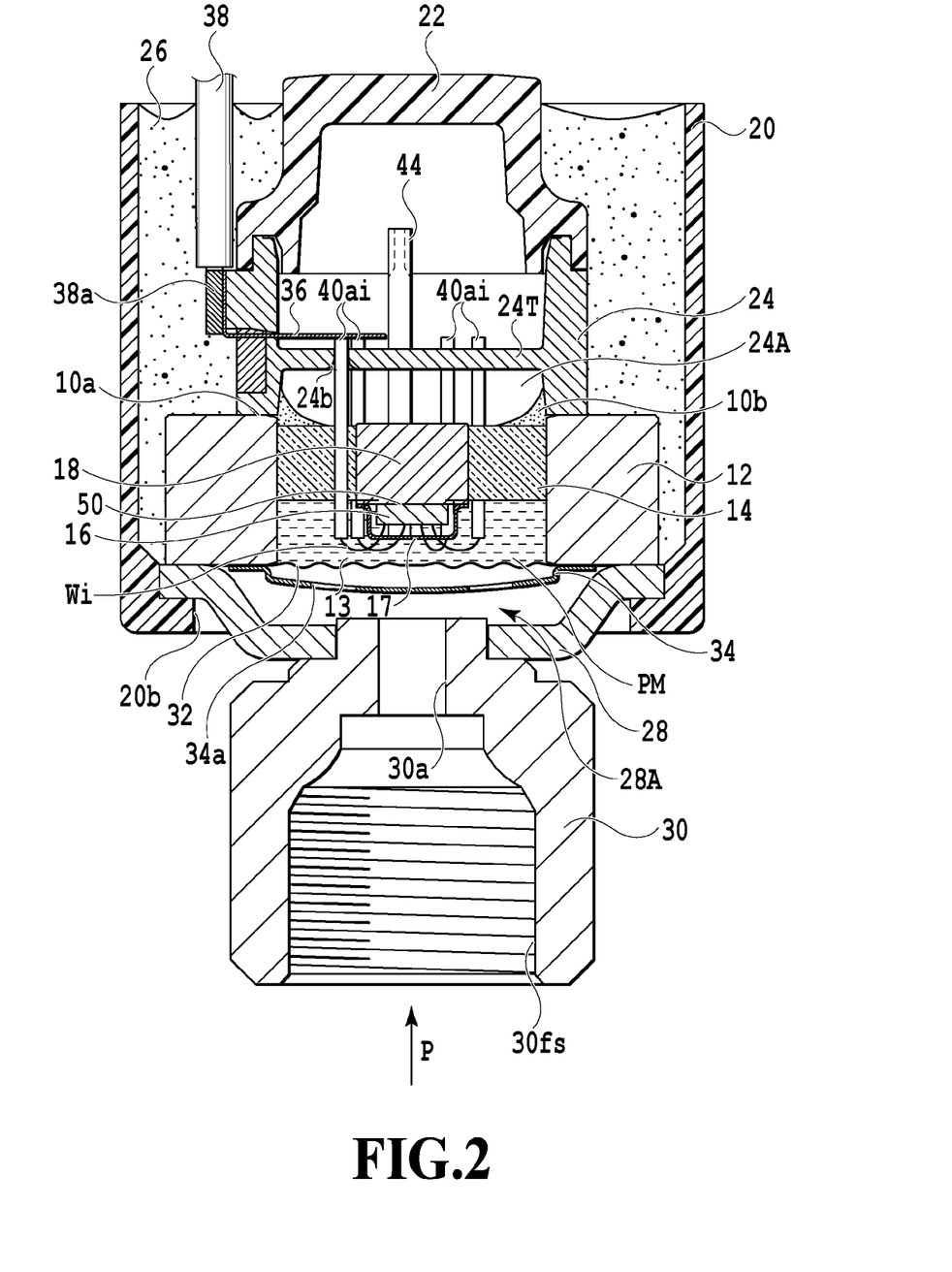
FIG. 2 is a cross-sectional view showing a configuration of an example of a pressure sensor applying the example of the shield structure for a pressure sensor shown in FIG. 1.

FIG. 2 schematically illustrates a configuration of a pressure sensor applying an example of a shield structure for a pressure sensor according to the present invention.

In FIG. 2, a pressure sensor comprises: a joint member 30 to be coupled to a piping into which a fluid supposed to undergo pressure detection is introduced; and a sensor unit accommodating portion which is joined to a base plate 28 of the joint member 30, accommodates a sensor unit to be described later, and supplies a detection output signal from the sensor chip to a given pressure measurement apparatus.

The joint member 30 made of metal includes a female screw portion 30$fs$ on its inside to be screwed into a male screw portion of a connector portion of the aforementioned piping. The female screw portion 30$fs$ is communicated with a port 30$a$ of the joint member 30 which brings the fluid supplied in a direction indicated with an arrow P to a pressure chamber 28A to be described later. One of open ends of the port 30$a$ is open toward the pressure chamber 28A formed between the base plate 28 of the joint member 30 and a diaphragm 32 of the sensor unit.

A contour portion of the sensor unit accommodating portion is formed serving as a cover member from a cylindrical waterproof case 20. An opening 20$b$ is formed at a lower end portion of the waterproof case 20 that is made of resin. A peripheral edge portion of the base plate 28 of the joint member 30 is engaged with a stepped portion on a peripheral edge of the opening 20$b$ inside the case 20.

A pressure of the fluid is brought into the pressure chamber 28A through the port 30$a$ of the joint member 30. A lower end surface of a housing 12 of the sensor unit is welded to the peripheral edge portion of the base plate 28.

The sensor unit for detecting the pressure inside the pressure chamber 28A and sending a detection output signal comprises, as its main elements, the cylindrical housing 12 made of metal, the diaphragm 32 made of metal and configured to isolate the pressure chamber 28A from an inner peripheral portion of the housing 12, a sensor chip 16 provided with a plurality of pressure detection elements and a signal processing electronic circuit unit to process signals from the pressure detection elements, a chip mounting member 18 made of metal and configured to support the sensor chip 16 at an end portion through an adhesive layer 50, a group of input-output terminals 40$ai$ (i=1 to 8) electrically connected to the sensor chip 16, and a hermetic glass 14 configured to fix the group of input-output terminals 40$ai$ and an oil filling pipe 44 to a portion between an outer peripheral surface of the chip mounting member 18 and an inner peripheral surface of the housing 12.

The diaphragm 32 is supported by one lower end surface of the housing 12 face to face relationship with the above-mentioned pressure chamber 28A. A diaphragm protection cover 34 to protect the diaphragm 32 provided in the pressure chamber 28A has a plurality of communication holes 34$a$. A peripheral edge of the diaphragm protection cover 34 is joined by welding to the lower end surface of the housing 12 together with a peripheral edge of the diaphragm 32. The housing 12, the diaphragm 32, the base plate 28, and the joint member 30 are conductively connected to one another and therefore have the same electric potential. In addition, the chip mounting member 18 is held by being insulated from the housing 12 by using an insulator such as the hermetic glass 14.

A liquid sealing chamber 13 formed between the diaphragm 32 made of metal and the sensor chip 16, an end surface of the hermetic glass 14 face to face relationship with the diaphragm 32 is filled with a predetermined amount of a pressure transmitting medium PM such as a silicone oil and a fluorine-based inert liquid via the oil filling pipe 44. Note that one end portion of the oil filling pipe 44 is squashed and occluded after the oil filling as indicated with chain double-dashed lines.

The group of input-output terminals 40$ai$ (i=1 to 8) is comprised of two power supply terminals, one output terminal, and five adjustment terminals. Both end portions of each terminal project from an end portion of the above-mentioned hermetic glass 14 toward the liquid sealing chamber 13 or toward a hole 24$b$ in a terminal block 24 to be described later. The two power supply terminals and the one output terminal are connected to core wires 38$a$ of respective lead wires 38 through connection terminals 36. Each lead wire 38 is connected to a predetermined pressure measurement apparatus, for example. Note that FIG. 2 illustrates only four terminals out of the eight terminals. The group of input-output terminals 40$ai$ are connected to the sensor chip 16 to be described later by using bonding wires Wi.

The terminal block 24 to align the group of input-output terminals 40$ai$ is molded by using a resin material such as polybutylene terephthalate (PBT) as a key component. The terminal block 24 has the plurality of holes 24$b$ into which the group of input-output terminals 40$ai$ are inserted, and a hollow portion 24A having a predetermined volume inside. A terminal alignment portion 24T has the plurality of holes 24$b$ located away from one another and is integrally molded in such a way as to orthogonally intersect the above-mentioned base end portion of the terminal block 24. A lower end surface of the base end portion of the terminal block 24 as an adhesion surface is adhered to an upper end surface of the housing 12 by using a silicone-based adhesive. Hereby, an annular adhesive layer 10$a$ having a predetermined thickness is formed on the upper end surface of the housing 12. Further, a coating layer 10$b$ made of a silicone-based adhesive is formed in a predetermined thickness on the entire upper end surface of the hermetic glass 14 from which the group of input-output terminals 40$ai$ project.

A space between an inner peripheral surface of the waterproof case 20 and an outer peripheral surface of the terminal block 24 serving as a terminal alignment member as well as an outer peripheral surface of an end cap 22 connected to the terminal block 24 and covering the holes 24b in the terminal alignment portion 24T mentioned above as well as an open end at an upper part of the terminal block 24, and a space between the inner peripheral surface of the waterproof case 20 and an outer peripheral surface of the housing 12 are filled with a given amount of a sealant 26. The terminal block 24 and the end cap 22 are facing the base plate 28 of the joint member 30 while interposing the above-described sensor unit and are disposed in the waterproof case 20.

An upper end surface of the end cap 22 projects upward from an open end of the waterproof case 20. Namely, a position of the upper end surface of the end cap 22 is located at a higher position than a position of an open end surface of the waterproof case 20.

Figure 4:
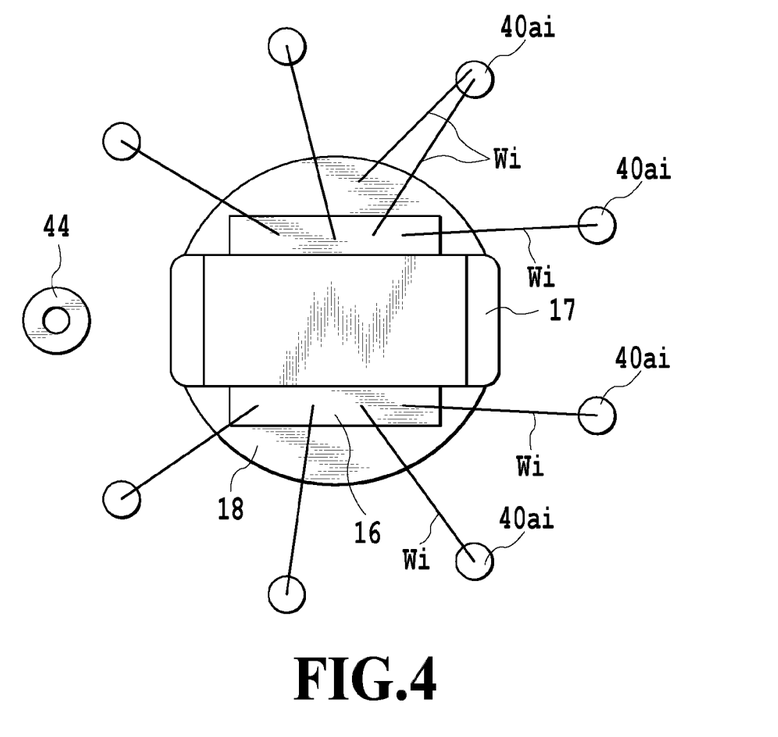
FIG. 4 is an arrow view which is viewed from a direction of an arrow illustrated in FIG. 3.

The sensor chip 16 is adhered to one end portion of the chip mounting member 18 located inside the liquid sealing chamber 13 through the adhesive layer 50, for example. As shown in FIG. 4, an external size of the sensor chip 16 having a substantially rectangular shape is set smaller than a diameter of the chip mounting member 18. The chip mounting member 18 is conductively connected to one or more of the group of input-output terminals 40ai through e.g. a zero (V) terminal and the bonding wire Wi. Accordingly, the electric potential of the chip mounting member 18 is set to the same electric potential as an electric potential of an electronic circuit mounted in the sensor chip 16.

A shielding plate 17 serving as an electric field blocking member is provided between one of end surfaces of the sensor chip 16 and the diaphragm 32 in the liquid sealing chamber 13. The shielding plate 17 is configured to block an electric field undesirable for the signal processing electronic circuit unit of the sensor chip 16. The shielding plate 17 may be formed from a conductive metal material such as stainless steel, copper, and aluminum, for example. Further the shielding plate 17 may be formed from any of insulating materials of resin, glass, ceramic, and the like with its surface layer being provided with a conductive layer made of conductive metal and formed by adhesion, vapor deposition, sputtering, plating, and the like, for example. As shown in FIG. 4, fixing end portions of the strip-shaped shielding plate 17 are brought close to an outer peripheral portion of the sensor chip 16 at the one end portion of the chip mounting member 18 and are joined to the chip mounting member 18 so as to have the same electric potential as the electric potential of the one end portion of the chip mounting member 18.

Figure 3:
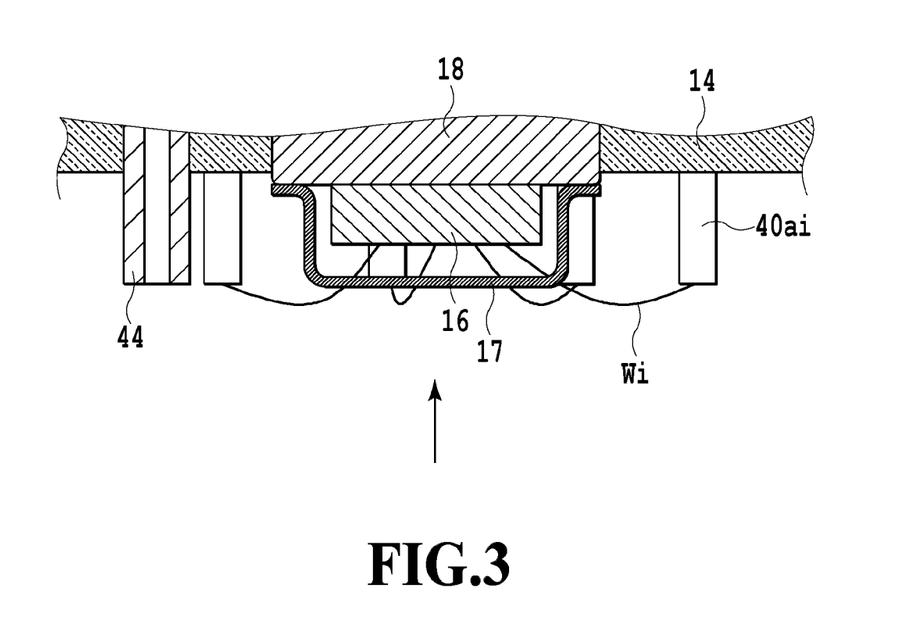
FIG. 3 is a partial enlarged view showing a partial enlarged portion III in the example shown in FIG. 1.

As shown in FIG. 3, a portion of the shielding plate 17 facing the one end surface of the sensor chip 16 covers a portion of the sensor chip 16 while providing a predetermined clearance with the one end surface of the sensor chip 16.

Note that an external size and a width dimension of the shielding plate 17 may be appropriately set according to a size to cover the entire signal processing electronic circuit unit of the sensor chip 16 so as to block the electric field undesirable for the signal processing electronic circuit unit of the sensor chip 16.

Accordingly, as a consequence of disposing the shielding plate 17 having the same electric potential as that of the signal processing electronic circuit unit of the sensor chip 16 between the diaphragm 32 and the sensor chip 16, an electric field to act on the one end surface of the sensor chip 16, which occurs due to a potential difference between the diaphragm 32 having the same electric potential as that of a primary power supply (not shown) of the attached unit and a control circuit (not shown) side, is blocked by the shielding plate 17. Moreover, since the electric potential of the shielding plate 17 and that of the chip mounting member 18 are set to the same electric potential, no electric field occurs therebetween. For this reason, because the potential difference that occurs between the sensor chip 16 and the diaphragm 32 does not act on the sensor chip 16, it is possible to prevent an effect on the electronic circuit in the sensor chip 16.

Figure 5:
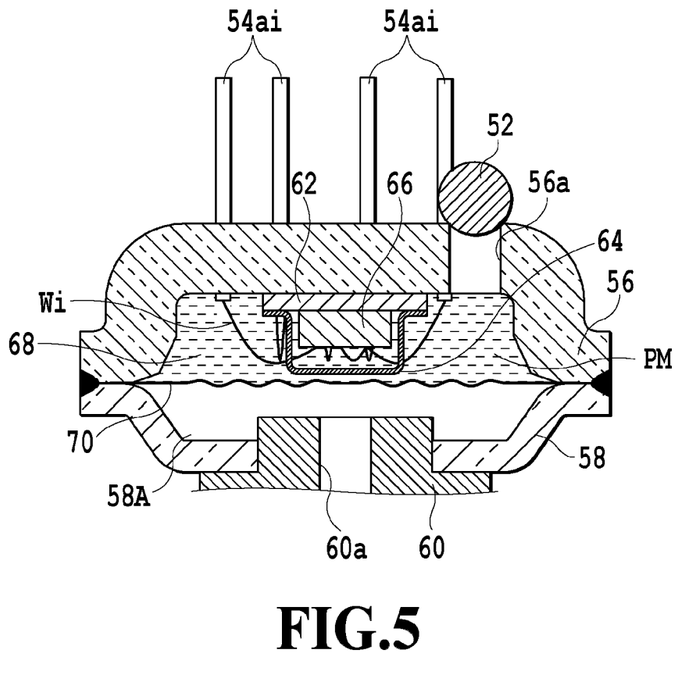
FIG. 5 is a cross-sectional view showing the essential parts of another example of the shield structure for a pressure sensor according to the present invention.

FIG. 5 partially shows the essential parts of the pressure sensor applying another example of the shield structure for a pressure sensor according to the present invention.

A pressure sensor shown in FIG. 5 comprises: a joint member 60 to be coupled to a piping into which a fluid supposed to undergo pressure detection is introduced; and a sensor housing 56 made of metal, joined by welding to a base plate 58 of the joint member 60, and configured to accommodate a sensor unit to be described later.

One of open ends of a port 60a of the joint member 60 is open toward a pressure chamber 58A formed between the base plate 58 of the joint member 60 and a diaphragm 70 of the sensor unit.

The sensor unit for detecting a pressure inside the pressure chamber 58A and to send a detection output signal comprises, as its main elements, the diaphragm 70 made of metal and configured to isolate the pressure chamber 58A from an inner peripheral portion of the sensor housing 56, a sensor chip 66 provided with a plurality of pressure detection elements and a signal processing electronic circuit unit to process signals from the pressure detection elements, a conductive plate 62 configured to support the sensor chip 66 at one end surface via an adhesive layer, and a group of input-output terminals 54ai (i=1 to 8) electrically connected to the sensor chip 66.

Figure 6:
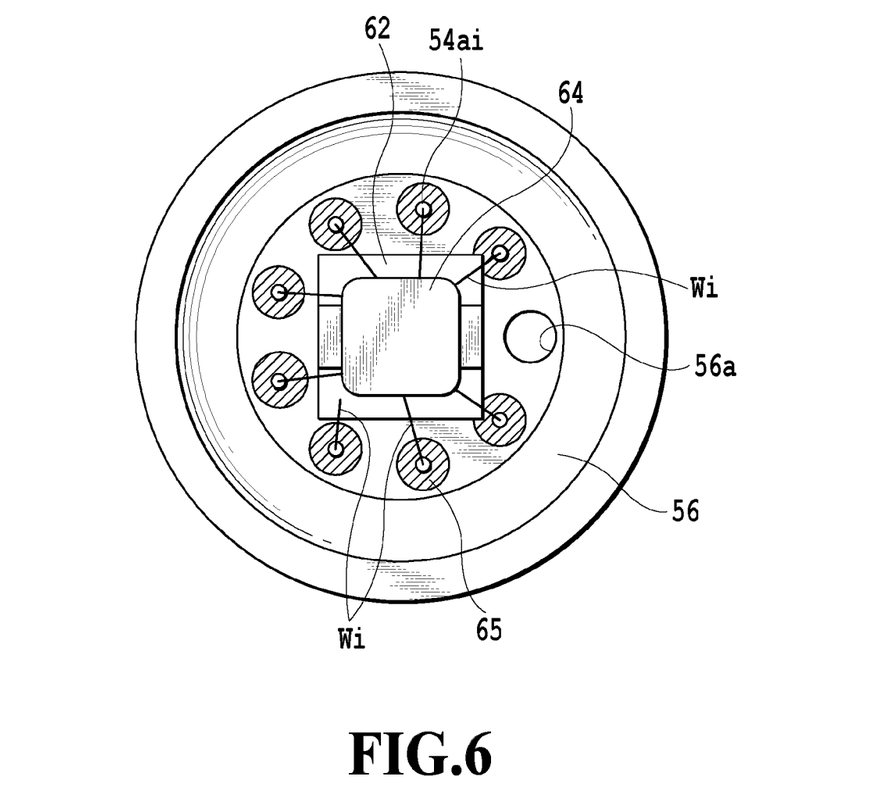
FIG. 6 is a plan view showing an electric field blocking member in a liquid sealing chamber in the example shown in FIG. 5.

The conductive plate 62 is made of an insulating material such as resin, glass, and ceramic, and one of end surfaces of the conductive plate 62 to support the sensor chip 66 is formed from any of metal which is one of gold, silver, copper, aluminum, and the like as well as an alloy film thereof serving as a conductive layer that is formed by adherence, vapor deposition, plating, or the like. The other end surface of the sensor chip 66 is joined to the one end surface of the conductive plate 62 mentioned above while the other end surface of the conductive plate 62 is joined to an inner peripheral surface on the liquid sealing member 68 side of the sensor housing 56. The diaphragm 70 made of metal is welded between a joining end of the sensor housing 56 face to face relationship with the pressure chamber 58A mentioned above and a joining end of the base plate 58. As a consequence, the sensor housing 56, the diaphragm 70, the base plate 58, and the joint member 60 are connected to and conducted with one another and the electric potentials thereof are set to the same electric potential. In addition, the sensor chip 66 is insulated from the sensor housing 56 by using the conductive plate 62. A liquid sealing chamber 68 which is a hermetically sealed space formed from the diaphragm 70 and an inner peripheral surface of the sensor housing 56 is filled with a predetermined amount of a pressure transmitting medium PM such as a silicone oil and a fluorine-based inert liquid, for example. After the pressure transmitting medium PM is put in via a hole 56a in the sensor housing 56, the hole 56a is closed with a plug member 52. As shown in FIG. 6, the group of input-output terminals 54ai are supported while being insulated from the sensor housing 56 through hermetic glass 65. The group of input-output terminals 54ai supported by the sensor housing 56 through the hermetic glass are connected to the sensor chip 66 by using the bonding wires Wi.

The shielding member 64 serving as the electric field blocking member is provided between the one end surface of the sensor chip 66 in the liquid sealing chamber 68 and the diaphragm 70. The shielding member 64 may be formed from any of conductive metal materials of stainless steel, copper, and aluminum, for example. Alternatively, the shielding member 64 may be formed from any of insulating materials of resin, glass, and ceramic, for example, and a conductive layer to be formed on its surface by adhesion, vapor deposition, sputtering, plating, and the like may be made of conductive metal.

The shielding member 64 is designed to entirely cover the one end surface of the sensor chip 66 while providing a predetermined clearance and thus to block an electric field undesirable for a signal processing electronic circuit unit of the sensor chip 66. Each fixing end portion of the shielding member 64 and the one end surface of the conductive plate 62 are conducted with and joined to each another through conductive surfaces. Accordingly, the electric potential of the shielding member 64 is set to the same electric potential as the electric potential of the one end surface of the conductive plate 62. The one end surface of the conductive plate 62 is connected to and conducted with one or more of the group of input-output terminals 54ai, e.g. a zero (V) terminal through the bonding wire Wi. As a consequence, the electric potential of the one end surface of the conductive plate 62 is set to the same potential as that of a signal processing electronic circuit unit of the sensor chip 66.

The other end surface of the conductive plate 62 is joined to the inner peripheral surface of the sensor housing 56. Note that without limitation to this example, the conductive plate 62 may be molded by using conductive resin, for example, and joined to the sensor housing 56 by using an insulator.

Accordingly, as a consequence of disposing the shielding member 64 having the same electric potential as that of the signal processing electronic circuit unit of the sensor chip 66 between the diaphragm 70 and the sensor chip 66, an electric field to act on the one end surface of the sensor chip 66, which occurs due to a potential difference between the diaphragm 70 having the same electric potential as that of the primary power supply (not shown) of the attached unit and the control circuit (not shown) side, is blocked by the shielding member 64. Moreover, since the electric potential of the shielding member 64 and the electric potential of the conductive plate 62 are set to the same electric potential, no electric field occurs therebetween. For this reason, because the potential difference that occurs between the sensor chip 66 and the diaphragm 70 does not act on the sensor chip 66, it is possible to prevent an effect on the sensor chip 66.

As it is clear from the foregoing description, according to an example of a shield structure for a pressure sensor of the present invention, an effect (a variation in output from the pressure sensor) on the electronic circuit in the sensor chip attributed to the electric potentials occurring between the sensor chip 16 or 66 and the diaphragm 32 or 70 in the pressure sensor is avoided by using the shielding plate 17 or the shielding member 64. Therefore, resistance to an electric field occurring between a diaphragm and a sensor chip will be improved.

The invention claimed is:

1. A shield structure for a pressure sensor comprising:
    a sensor unit including a sensor chip for detecting a pressure and sending a detection output signal, a supporting member supporting the sensor chip, a diaphragm for partitioning a liquid sealing chamber which the sensor chip and the supporting member are placed into a pressure chamber face to face relationship with the liquid sealing chamber, and a group of input-output terminals electrically connected to the sensor chip and to the supporting member; and
    an electric field blocking member placed between one end surface of the sensor chip in the liquid sealing chamber and the diaphragm by being supported from the supporting member, and for blocking an electric field acting on a signal processing electronic circuit unit of the sensor chip, wherein the electric field blocking member includes a fixing end portion that is joined to the supporting member, wherein
    an electric potential of a portion of the supporting member supporting the sensor chip and an electric potential of the electric field blocking member are an electric potential equal to an electric potential of the signal processing electronic circuit unit of the sensor chip.

2. The shield structure for a pressure sensor according to claim 1, wherein the supporting member is supported by a sensor housing through an insulator.

3. The shield structure for a pressure sensor according to claim 1, wherein the supporting member is a chip mounting member.

4. The shield structure for a pressure sensor according to claim 1, wherein the supporting member is a conductive plate joined to a sensor housing.

5. A pressure sensor comprising:
    a sensor unit including a sensor chip for detecting a pressure and sending a detection output signal, a supporting member supporting the sensor chip, a diaphragm for partitioning a liquid sealing chamber which the sensor chip and the supporting member are placed into a pressure chamber face to face relationship with the liquid sealing chamber, and a group of input-output terminals electrically connected to the sensor chip and to the supporting member;
    an electric field blocking member placed between one end surface of the sensor chip in the liquid sealing chamber and the diaphragm by being supported by the supporting member, and for blocking an electric field acting on a signal processing electronic circuit unit of the sensor chip, wherein the electric field blocking member includes a fixing end portion that is joined to the supporting member; and
    a sensor unit accommodating portion accommodating the sensor unit and the electric field blocking member, wherein
    an electric potential of a portion of the supporting member supporting the sensor chip and an electric potential of the electric field blocking member are an electric potential equal to an electric potential of the signal processing electronic circuit unit of the sensor chip.

6. The pressure sensor according to claim 5, wherein the supporting member is supported by a sensor housing through an insulator.

* * * * *